United States Patent
Kuo et al.

(10) Patent No.: US 8,873,228 B2
(45) Date of Patent: Oct. 28, 2014

(54) LCD MODULE AND FRAME THEREOF

(75) Inventors: Yicheng Kuo, Shenzhen (CN);
Shihhsiang Chen, Shenzhen (CN); Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 208 days.

(21) Appl. No.: 13/510,325

(22) PCT Filed: Apr. 27, 2012

(86) PCT No.: PCT/CN2012/074808
§ 371 (c)(1),
(2), (4) Date: May 17, 2012

(87) PCT Pub. No.: WO2013/159327
PCT Pub. Date: Oct. 31, 2013

(65) Prior Publication Data
US 2013/0286556 A1    Oct. 31, 2013

(30) Foreign Application Priority Data
Apr. 25, 2012  (CN) .......................... 201210124153.8

(51) Int. Cl.
*G06F 1/16*    (2006.01)

(52) U.S. Cl.
USPC .................. 361/679.21; 348/455; 345/589

(58) Field of Classification Search
USPC ........ 349/112.65, 15, 76, 137, 58, 192, 1, 54, 349/110, 158, 61, 33, 84, 65, 40, 43, 143, 349/155; 348/374, 739, 46, 135, 837, 455, 348/458, 411; 361/679.24, 679.25, 679.26, 361/679.27, 679.01, 679.02, 679.34, 361/679.56, 679.21, 679.29, 679.55; 345/174, 204, 690, 173, 156, 175, 589, 345/545, 92, 99, 158, 501; 455/575.1, 566, 455/575.4, 575.3, 550.1, 558, 347, 419, 51, 455/556, 456.1, 436, 414.1, 411, 415
See application file for complete search history.

(56) References Cited

U.S. PATENT DOCUMENTS 8,395,720 B2 * 3/2013 Lim ................................ 349/58
2013/0278870 A1 * 10/2013 Kuo et al. ....................... 349/84

FOREIGN PATENT DOCUMENTS

| CN | 101672458 A | 3/2010 |
|----|-------------|--------|
| CN | 201489228 U | 5/2010 |
| CN | 101984372 A | 3/2011 |
| CN | 102243391 A | 11/2011 |
| CN | 202189193 U | 4/2012 |

OTHER PUBLICATIONS

Han Xu, the International Searching Authority written comments, Jan. 2013, CN.

* cited by examiner

*Primary Examiner* — Hung Duong
(74) *Attorney, Agent, or Firm* — IPro, Inc.; Na Xu

(57) ABSTRACT

The invention provides an LCD module and a frame thereof. The frame comprises a plurality of segmented pieces constituting the frame; the frame comprises a front frame, and a middle frame; the structure of the segmented piece(s) constituting the front frame is the same as that of the segmented piece(s) constituting the middle frame. Because the front frame and the middle frame of the LCD module of the invention are comprised of a plurality of segmented pieces of the same structure, the segmented pieces constituting the front frame can be superposed outside the segmented pieces constituting the middle frame, and then the front frame and middle frame of different sizes can be respectively formed. Thus, because the segmented pieces constituting the front frame and middle frame are of the same structure, the segmented pieces can be produced by only one mold, and the front frame and the middle frame can be produced just by the same mold, thereby saving the production cost. In addition, the segmented pieces can be cut only on one section without singly producing each segmented piece, thereby further reducing the production cost of LCD modules.

9 Claims, 4 Drawing Sheets

LCD MODULE AND FRAME THEREOF

TECHNICAL FIELD

The invention relates to the field of liquid crystal displays (LCDs), and more particularly to an LCD module and a frame thereof.

BACKGROUND

LCD modules are used as main components of LCD devices. A conventional LCD module includes a front frame, an LCD panel, a middle frame, an optical film, a light guide panel (LGP), a lightbar, a back cover and the like; the rubber frame plays a role of fixing the LGP and supporting the LCD panel. The structures of the rubber frames of different LCD devices are similar. The LCD panel is pressed on the middle frame by the front frame, to be fixed.

FIG. 1 shows a simplified structure diagram of a front frame of a conventional LCD module. The front frame 100 includes a front frame surface 110, and a front frame sidewall 120 connected with the front frame surface 110. FIG. 2 shows a simplified structure diagram of a middle frame of a conventional LCD module. Similarly, the middle frame 200 also includes a middle frame surface 210, and a middle frame sidewall 220. For the difference of the front frame 100 and the middle frame 200 in size and structure, different molds are required for production and manufacture, and then production cost is added.

SUMMARY

In view of the above-described problems, the aim of the invention is to provide a low-cost LCD module and a frame thereof with the advantages of good generality and cost saving.

The aim of the LCD device of the invention is achieved by the following technical scheme.

An LCD device module comprises a frame; the frame comprises a plurality of segmented pieces constituting the frame; the frame comprises a front frame, and a middle frame; the structure of the segmented piece(s) constituting the front frame is the same as that of the segmented piece(s) constituting the middle frame; the segmented piece is provided with a fixing structure(s), and a butting structure(s) used for matching with a fixing structure(s) of another segmented piece, and the segmented piece constituting the front frame is matched and fixed together with the butting structure of the segmented piece constituting the middle frame by the fixing structure. The segmented piece comprises a first panel surface, and a second panel surface which is connected with and relatively perpendicular to the first panel surface; the fixing structure is a fixing snag arranged on the second panel surface, the butting structure is a fixing hole which is arranged in the second panel surface and corresponds to the fixing snag, and the fixing snag is of a wedge structure. The edge of the LCD panel is butted and limited by a positioning snag of the segmented piece constituting the front frame. The first panel surface of the segmented piece is further provided with a positioning hole(s), and the positioning snag of the segmented piece constituting the front frame is inserted in the positioning hole of the segmented piece constituting the middle frame.

The aim of the invention is further achieved by the following technical scheme. An LCD device module comprises a frame; the frame comprises a plurality of segmented pieces constituting the frame; the frame comprises a front frame, and a middle frame; the structure of the segmented piece(s) constituting the front frame is the same as that of the segmented piece(s) constituting the middle frame.

Preferably, the segmented piece is provided with a fixing structure(s), and a butting structure(s) used for matching with a fixing structure(s) of another segmented piece, and the segmented piece constituting the front frame is matched and fixed together with the butting structure of the segmented piece constituting the middle frame by the fixing structure. The middle frame and the front frame are fixed together by the fixing structures and the butting structures arranged on the segmented pieces; thus, the front frame is fixed on the middle frame.

Preferably, the segmented piece comprises a first panel surface, and a second panel surface which is connected with and relatively perpendicular to the first panel surface; the fixing structure is a fixing snag arranged on the second panel surface, and the butting structure is a fixing hole which is arranged in the second panel surface and corresponds to the fixing snag. The matching mode of the fixing snag and the fixing hole is suitable for assembly, and has simple assembly process, and high efficiency.

Preferably, the fixing snag is of a wedge structure. The snag of a wedge structure is easily inserted in the fixing hole, and is conveniently compressed in the fixing hole.

Preferably, the first panel surface of the segmented piece is provided with a positioning snag(s), and the positioning snag of the segmented piece constituting the middle frame is butted on the LGP of the LCD module. The LGP is positioned by butting the LGP through the snag of the segmented piece, and the structure of the snag is simple.

Preferably, the edge of the LCD panel is butted and limited by the positioning snag of the segmented piece constituting the front frame. The edge of the LCD panel is butted and limited by the positioning snag; the structure of the snag is simple, and assembly is convenient.

Preferably, the first panel surface of the segmented piece is further provided with a positioning hole(s), and the positioning snag of the segmented piece constituting the front frame is inserted in the positioning hole of the segmented piece constituting the middle frame. The positioning snag is inserted in the positioning hole; thus, the segmented piece can be better fixed on another segmented piece, and the segmented piece constituting the front frame can be accurately positioned and assembled on the LCD module.

A frame of an LCD module comprises a plurality of segmented pieces constituting the frame. The frame comprises a front frame, and a middle frame; the structure of the segmented piece(s) constituting the front frame is the same as that of the segmented piece(s) constituting the middle frame.

Preferably, the segmented piece is provided with a fixing structure(s), and a butting structure(s) used for butting with the fixing structure of another segmented piece, and the segmented piece constituting the front frame of the LCD module is matched and fixed together with the butting structure of the segmented piece constituting the middle frame of the LCD module by the fixing structure. The middle frame and the front frame are fixed together by the fixing structures and the butting structures arranged on the segmented pieces, and then the front frame is fixed on the middle frame.

Preferably, the segmented piece comprises a first panel surface, and a second panel surface which is connected with and relatively perpendicular to the first panel surface; the fixing structure is a fixing snag of the second panel surface, and the butting structure is a fixing hole which is arranged in the second panel surface and corresponds to the fixing snag. The first panel surface of the segmented piece is provided with a positioning snag(s) and a positioning hole(s), and the snag of the segmented piece constituting the middle frame is butted on the LGP of the LCD module; the fixing snag of segmented piece constituting the front frame is inserted in the positioning hole of the segmented piece constituting the middle frame, and the edge of the LCD panel is butted and limited by the positioning snag of the segmented piece constituting the front frame. Both the functions of the front frame and the middle frame can be achieved by using the segmented pieces of the same structure. The segmented pieces have the advantages of simple structure, and low production cost.

Because the front frame and the middle frame of the LCD module of the invention are comprised of a plurality of segmented pieces of the same structure, the segmented pieces constituting the front frame can be superposed outside the segmented pieces constituting the middle frame, and then the front frame and middle frame of different sizes can be respectively formed. Thus, because the segmented pieces constituting the front frame and the middle frame are of the same structure, the segmented pieces can be produced by only one mold, and the front frame and the middle frame can be produced just by the same mold, thereby saving the production cost. In addition, because the front frame and the middle frame are segmented, and the segmented pieces are of the same structure, the segmented pieces are cut only on one section without singly producing each segmented piece, and segment pieces of different sizes can be cut in accordance with LCD modules of different sizes, thereby further reducing the production cost of LCD modules.

Legends: 100. front frame; 200. middle frame; 300. backplane; 400. LCD panel; 800. segmented piece; 110. front frame surface; 120. front frame sidewall; 210. middle frame surface; 220. middle frame sidewall; 310. reflector plate; 320. lightbar; 330. LGP; 340. optical film. 810. first panel surface; 811. positioning snag; 812. positioning hole; 820. second panel surface; 821. fixing snag; 822. fixing hole.

DETAILED DESCRIPTION

The invention will further be described in detail in accordance with the figures and the preferable examples.

Figure 1:
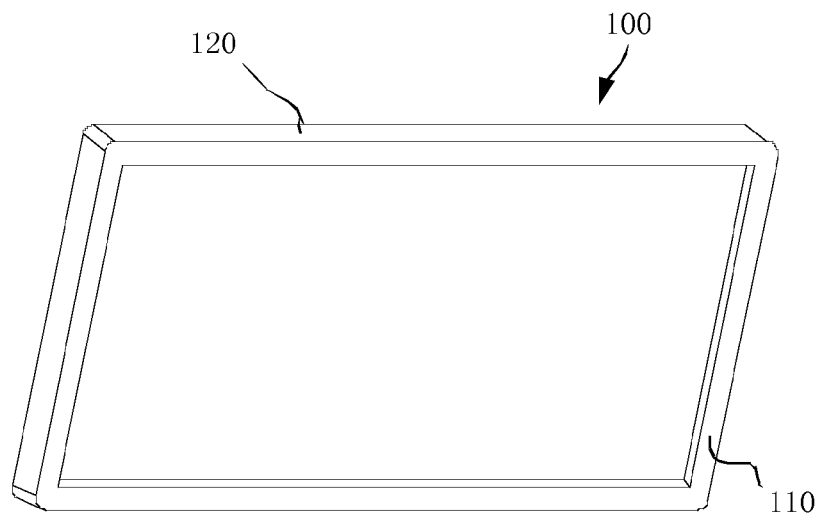
FIG. 1 is a simplified structure diagram of a conventional front frame.
Figure 2:
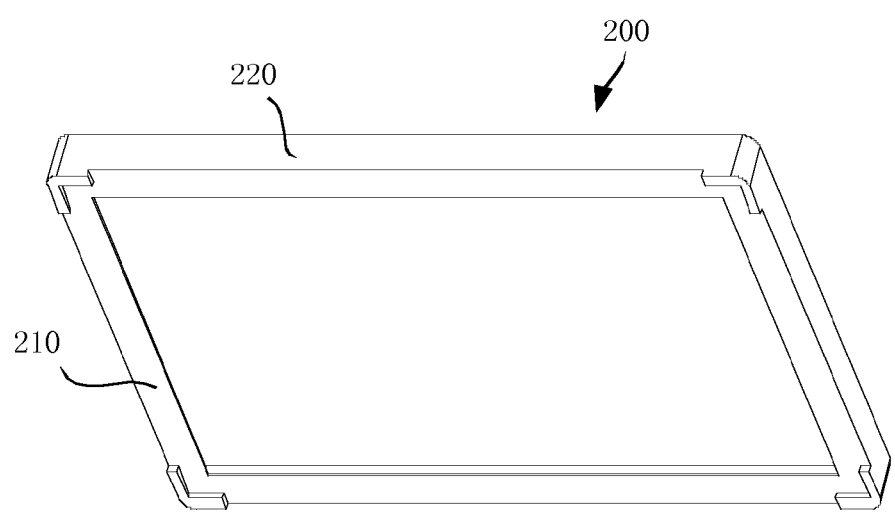
FIG. 2 is simplified structure diagram of a conventional middle frame.
Figure 3:
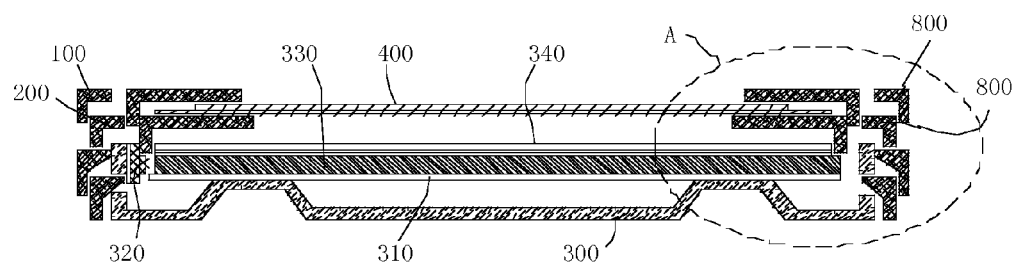
FIG. 3 is a simplified structure diagram of an LCD module of an example of the invention.
Figure 5:
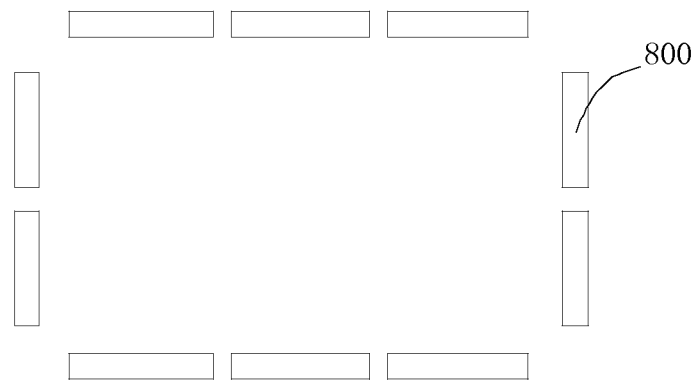
FIG. 5 is a simplified block diagram of a front frame or a middle frame of an example of the invention.
Figure 6:
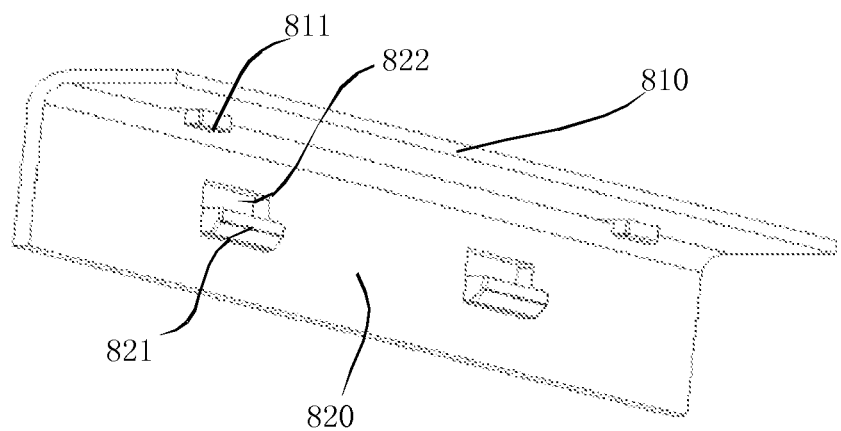
FIG. 6 is a simplified structure diagram of a segmented piece of an example of the invention.
Figure 7:
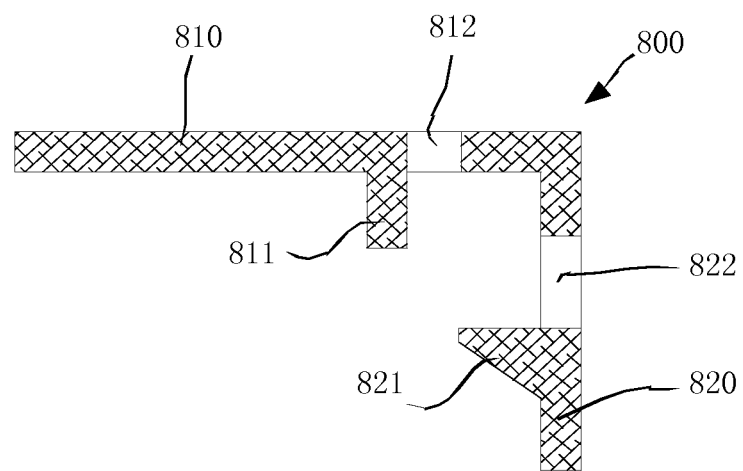
FIG. 7 is a sectional diagram of a segmented piece of an example of the invention.

FIG. 3 shows an LCD module of the invention, comprising a backplane 300, a reflector plate 310 arranged on the backplane 300, an LGP 330 arranged in the backplane 300, an optical film 340 arranged on the LGP 330, a lightbar 320 arranged on the side wall of the backplane 300, and a frame arranged outside the backplane 300; the frame comprises a middle frame 200, and a front frame 100 arranged outside the middle frame 200; an LCD panel 300 is supported by the middle frame 200, and is compressed by the front frame 100. As shown in FIG. 3 and FIG. 5, the front frame 100 or the middle frame 200 are respectively comprised of a plurality of segment pieces of the same structure.

As shown in FIGS. 4-7, because the front frame 100 and the middle frame 200 are respectively comprised of a plurality of segmented pieces of the same structure, we regard that the LCD panel 400 of the LCD module is supported by a plurality of segmented pieces 800, and is compressed by a plurality of segmented pieces 800. Each segmented piece 800 is an L-shaped section, and comprises a first panel surface 810, and a second panel surface 820 which is arranged relatively perpendicularly to the first panel surface 810. The first panel surface 810 is provided with a rectangular positioning snag(s) 811, and a positioning hole(s) 812 arranged at the root of the positioning snag(s) 811; and the second panel surface 820 is provided with a wedge-shaped fixing snag(s) 821, and a fixing hole(s) 822 fixed at the root of the fixing snag(s) 821.

Figure 4:
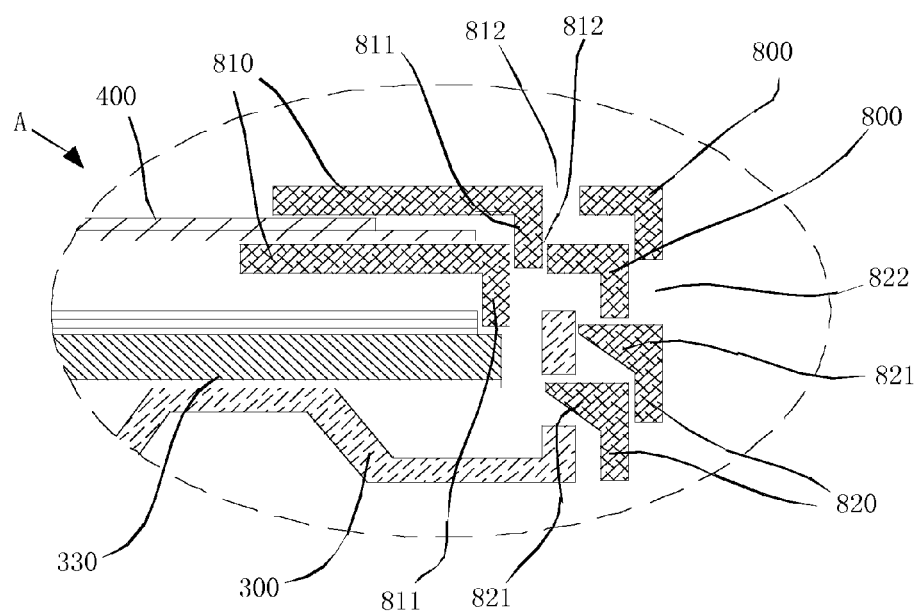
FIG. 4 is a partial enlarged view of A shown in FIG. 3.

As shown in FIG. 4, the backplane 300 of the LCD module is provided with corresponding fixing holes (not shown in the Figure), so that the segmented pieces 800 constituting the middle frame can be inserted into the backplane 300 by the wedge-shaped fixing snags 821 to be butted and fixed. The wedge-shaped snags are easily inserted in the fixing holes, and are conveniently compressed in the fixing holes. Correspondingly, the segmented pieces 800 constituting the front frame are inserted into in the fixing holes 822 of the segmented pieces 800 constituting the middle frame by the wedge-shaped fixing snags 821 to be butted and fixed. Thus, the middle frame and the backplane, and the front frame and the middle frame are directly or indirectly connected and fixed, thereby saving the assembling time of segmented pieces. However, the segmented pieces constituting the middle frame can be locked on the backplane by screws or other modes, and the segmented pieces 800 constituting the front frame can also be locked on the segmented pieces constituting the middle frame by screws. For the fixing mode of the segmented piece(s), the fixing snag 821 or screw plays a role of a fixing structure, and the fixing hole 822 or threaded hole in the segmented piece is equivalent to a butting structure matched with the fixing structure.

The first panel surface 810 of the segmented piece 800 constituting the middle frame is used for supporting the LCD panel 400, and the rectangular positioning snag(s) 811 thereon is used for compressing the LGP 330; the first panel surface 810 of the segmented piece 800 constituting the front frame is used for compressing the LCD panel 400, and the rectangular positioning snag(s) 811 thereon is inserted in the positioning hole(s) 812 of the segmented piece 800 constituting the middle frame; thus, the front frame can be accurately positioned and fixed on the segmented piece 800 constituting the middle frame. Moreover, the edge of the LCD panel 400 is butted by the rectangular positioning snag(s) 811 of the segmented piece constituting the front frame, to limit the freedom degree of the LCD panel 400, and increase the assembling reliability of the LCD panel 400.

The invention is described in detail in accordance with the above contents with the specific preferred examples. However, this invention is not limited to the specific examples. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. An LCD module, comprising: a frame; wherein said frame comprises a plurality of segmented pieces constituting said frame; said frame comprises a front frame, and a middle frame; the structure of the segmented piece(s) constituting said front frame is the same as that of the segmented piece(s) constituting said middle frame; said segmented piece is provided with a fixing structure(s) and a butting structure(s) used for matching with a fixing structure(s) of another segmented piece, and said segmented piece constituting said front frame is matched and fixed together with the butting structure of said segmented piece constituting said middle frame by said fixing structure; said segmented piece comprises a first panel surface, and a second panel surface which is connected with and relatively perpendicular to said first panel surface; said fixing structure is a fixing snag arranged on said second panel surface, said butting structure is a fixing hole which is arranged in said second panel surface and corresponds to said fixing snag, and said fixing snag is of a wedge structure; the edge of said LCD panel is butted and limited by a positioning snag(s) of said segmented piece constituting said front frame; the first panel surface of said segmented piece is further provided with a positioning hole(s), and the positioning snag of said segmented piece constituting said front frame is inserted in the positioning hole of said segmented piece constituting said middle frame.

2. An LCD module, comprising: a frame; wherein said frame comprises a plurality of segmented pieces constituting said frame; said frame comprises a front frame, and a middle frame; the structure of the segmented piece(s) constituting said front frame is the same as that of the segmented piece(s) constituting said middle frame, wherein said segmented piece is provided with a fixing structure(s) and a butting structure(s) used for matching with a fixing structure(s) of another segmented piece, and said segmented piece constituting said front frame is matched and fixed together with the butting structure(s) of said segmented piece constituting said middle frame by said fixing structure.

3. The LCD module of Claim 2, wherein said segmented piece comprises a first panel surface, and a second panel surface which is connected with and relatively perpendicular to said first panel surface; said fixing structure is a fixing snag arranged on said second panel surface, and said butting structure is a fixing hole which is arranged in said second panel surface and corresponds to said fixing snag.

4. The LCD module of claim 3, wherein said fixing snag is of a wedge structure.

5. The LCD module of claim 3, wherein the first panel surface of said segmented piece is provided with a positioning snag(s), and the positioning snag(s) of said segmented piece constituting said middle frame is butted on an LGP of said LCD module.

6. The LCD module of claim 5, wherein the edge of said LCD panel is butted and limited by the positioning snag of said segmented piece constituting said front frame.

7. The LCD module of claim 6, wherein the first panel surface of said segmented piece is further provided with a positioning hole(s), and the positioning snag of said segmented piece constituting said front frame is inserted in the positioning hole of said segmented piece constituting said middle frame.

8. A frame of an LCD module, comprising: a plurality of segmented pieces constituting said frame; wherein said frame comprises a front frame, and a middle frame; the structure of the segmented piece(s) constituting said front frame is the same as that of the segmented piece(s) constituting said middle frame, wherein said segmented piece is provided with a fixing structure(s) and a butting structure(s) used for butting with a fixing structure(s) of another segmented piece, and said segmented piece constituting the front frame of said LCD module is matched and fixed together with the butting structure(s) of said segmented piece constituting the middle frame of said LCD module by said fixing structure.

9. The frame of an LCD module of Claim 8, wherein said segmented piece comprises a first panel surface, and a second panel surface which is connected with and relatively perpendicular to said first panel surface; said fixing structure is a fixing snag arranged on said second panel surface, and said butting structure is a fixing hole which is arranged in said second panel surface and corresponds to said fixing snag; the first panel surface of said segmented piece is provided with a positioning snag(s) and a positioning hole(s), and the snag of said segmented piece constituting said middle frame is butted on the LGP of said LCD module; the fixing snag of said segmented piece constituting said front frame is inserted in the positioning hole of said segmented piece constituting said middle frame, and the edge of said LCD panel is butted and limited by the positioning snag of said segmented piece constituting said front frame.

* * * * *